United States Patent Office 2,839,565
Patented June 17, 1958

2,839,565
ISOPROPYL BORATE CONTAINING COMBINED BORIC OXIDE

Frank Henderson May, Whittier, Calif., assignor to American Potash & Chemical Corporation, a corporation of Delaware No Drawing. Application November 19, 1954
Serial No. 468,159
1 Claim. (Cl. 260—462)

This invention relates to a new compound, particularly isopropyl borate containing combined boric oxide. This composition can be represented as follows:

$$(C_3H_7O)_3B \cdot n(B_2O_3)$$

where $n$ has a value of at least 1. Such compositions are particularly useful as sources of pure boric oxide and, because of their affinity for water, as drying agents.

I have observed that when the residue remaining after production of triisopropyl borate and containing excess boric oxide was stored in a sealed container, a material sublimed and crystallized on the walls of the container in relatively large, needle-like crystals. Upon analysis, it was found that these crystals were of the composition indicated by the above formula where $n$ had a value of at least 1. It has further been observed that when these crystals were melted, isopropyl borate was easily distilled from them, giving a pot residue which was crystalline on cooling, and which had the composition indicated by the above formula where $n$ has a value greater than 1, this value depending on the extent of the distillation.

The following examples illustrate various methods for manufacture of the compounds of the present invention. It is to be understood, however, that the invention is not limited to the following methods of preparation of the novel compounds.

*Preparation of $(C_3H_7O)_3B \cdot n(B_2O_3)$ where $n$ is 1*

*Example I.*—1158 grams of boric oxide were added slowly to 2998 grams of isopropyl alcohol contained in a suitable vessel, fitted with an efficient agitator, reflux condenser, and a cooling coil. The alcohol was heated previous to the boric oxide addition to a temperature of 55° C., to ensure continuous solution and reaction of the $B_2O_3$. The boric oxide was added slowly at a temperature maintained below boiling by use of cooling as required. In a batch operation, it is desirable to seed the mixture with boric acid when about half of the boric oxide has been added, otherwise, saturation may occur and cause self-seeding with sudden generation of heat upon the instantaneous crystallization of solids. Under these conditions, the mixture may reach boiling and overload the reflux condenser, causing excessive pressure in the reaction pot, possible loss of product, and an extremely hazardous condition.

After crystallization of solids had commenced, the remainder of the boric oxide was added quite rapidly and the mixture heated to boiling and refluxed for a short time until a constant temperature was reached, indicating complete reaction had taken place. The slurry was then cooled and agitated to crystallize as much boric acid as possible. Cooling also helps to decrease possible losses during the filtering operation and, generally, cooling to a temperature of 8° to 10° C. suffices. The resulting mixture was then filtered and 3062 grams of filtrate distilled to remove 1790 grams of unreacted alcohol and isopropyl ester. The still bottoms remaining consisted of 1272 grams of a clear solution which, upon cooling, formed a slurry containing white needle-like crystals. This slurry was filtered in a dry atmosphere to produce 255 grams of damp solids analyzing 11.51% boron, and 1017 grams of filtrate analyzing 7.21% boron. The damp solids were dried at room temperature under vacuum to free-flowing crystals analyzing 12.60% boron, corresponding to a value of $n=1$. A second crop of very large crystals later formed in the mother liquor. These were drained free of liquor and, without further treatment, were analyzed, a 12.60% boron content being present. These crystalline materials are easily recrystallized in isopropyl borate, retaining a composition in which the molar ratio of isopropyl borate to $B_2O_3$ is 1.

*Example II.*—A material embodying this invention was prepared by the hydrolysis of isopropyl borate with water, followed by the removal of alcohol by fractional distillation, according to the equation:

$$3(C_3H_7O)_3B + 3H_2O \rightarrow (C_3H_7O)_3B \cdot B_2O_3 + 6C_3H_7OH$$

Excess ester was used to provide a crystallization and filtration medium.

1051 grams of isopropyl borate and 61 grams of $H_2O$ were mixed and 361 grams of isopropyl alcohol and 52 grams of ester were removed by fractional distillation. The pot residue was a slightly viscous material which formed a slurry containing white needle-like crystals on cooling. The slurry was filtered in a dry atmosphere at room temperature using a Buchner funnel. 211 grams of slightly damp solids were removed from a filtrate containing 7% boron. The solids were dried under vacuum at room temperature to free-flowing crystals analyzing 12.6% boron, corresponding to a value of $n=1$.

*Example III.*—The material of this invention was prepared using stoichiometric quantities of boric acid and isopropyl borate, followed by the removal of isopropyl alcohol by fractional distillation, according to the equation:

$$2(C_3H_7O)_3B + H_3BO_3 \rightarrow (C_3H_7O)_3B \cdot B_2O_3 + 3C_3H_7OH$$

376 grams of isopropyl borate and 62 grams of orthoboric acid were mixed and 153 grams of distillate containing 149 grams of isopropyl alcohol were removed by fractional distillation. The pot residue was a clear viscous material which crystallized on cooling to form 285 grams of damp solids containing 11.31% boron.

*Preparation of $(C_3H_7O)_3B \cdot n(B_2O_3)$, where $n$ is greather than 1*

*Example IV.*—The 285 grams of slightly damp solids of Example III, analyzing 11.31% boron, were melted and 117 grams of distillate, analyzing 5.28% boron, were removed by fractional distllation under reduced pressure (47 mm. Hg). The pot residue was composed of 164 grams of clear viscous material which formed a mass of crystals on cooling. Analysis of these solids showed that they contained 15.8% boron, corresponding to a value for $n$ of 1.78.

*Example V.*—1500 grams of isopropyl alcohol and 574 grams of $B_2O_3$ were mixed and filtered following the procedure used in Example I. 1459 grams of filtrate were distilled to remove 1342 grams of isopropyl alcohol and isopropyl borate, leaving a pot residue consisting of 117 grams of a viscous solution which, on cooling, formed a mass of crystals analyzing 17.4% boron, corresponding to a value for $n$ of 2.30.

I claim:

As a new compound, isopropyl borate of the formula $$(C_3H_7O)_3B \cdot B_2O_3$$

References Cited in the file of this patent

Kuivila et al.: J. Amer. Chem. Soc. 73, pages 123–4 (1951).

Goubeau et al.: Z. anorg. U. allgem Chem. 267, pages 1–26 (1951), abstracted in Chem. Abs. 46, column 3893 (1952).